United States Patent
Ohtorii

(10) Patent No.: US 7,315,669 B2
(45) Date of Patent: Jan. 1, 2008

(54) PHOTOELECTRIC TRANSDUCER AND PHOTOELECTRIC TRANSDUCER ELEMENT ARRAY

(75) Inventor: Hiizu Ohtorii, Kanagawa (JP)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 11/186,603

(22) Filed: Jul. 19, 2005

(65) Prior Publication Data

US 2006/0016962 A1  Jan. 26, 2006

(30) Foreign Application Priority Data

Jul. 23, 2004  (JP)  ............... 2004-215340

(51) Int. Cl.
*G02B 6/12* (2006.01)
*G02B 6/122* (2006.01)

(52) U.S. Cl. ..................... 385/14; 250/208.2

(58) Field of Classification Search ............. 250/208.2; 385/14

See application file for complete search history.

(56) References Cited

U.S. PATENT DOCUMENTS

2002/0025122 A1* 2/2002 Ouchi et al. .................. 385/88

* cited by examiner

*Primary Examiner*—Evan Pert
(74) *Attorney, Agent, or Firm*—Robert J. Depke; Rockey, Depke & Lyons, LLC.

(57) ABSTRACT

A photoelectric transducer has an optical waveguide and a photoelectric transducer element array of photoelectric transducer elements optically coupled to the optical waveguide. The photoelectric transducer element array has a common conductive layer, and the photoelectric transducer elements are mounted on the common conductive layer in alignment with entrance or exit ends of the optical waveguide. The photoelectric transducer elements having respective first poles, and the photoelectric transducer element array has a second pole disposed in opposite relation to the first poles and connected as a reference potential setting electrode through the common conductive layer to at least two of the photoelectric transducer elements.

20 Claims, 12 Drawing Sheets

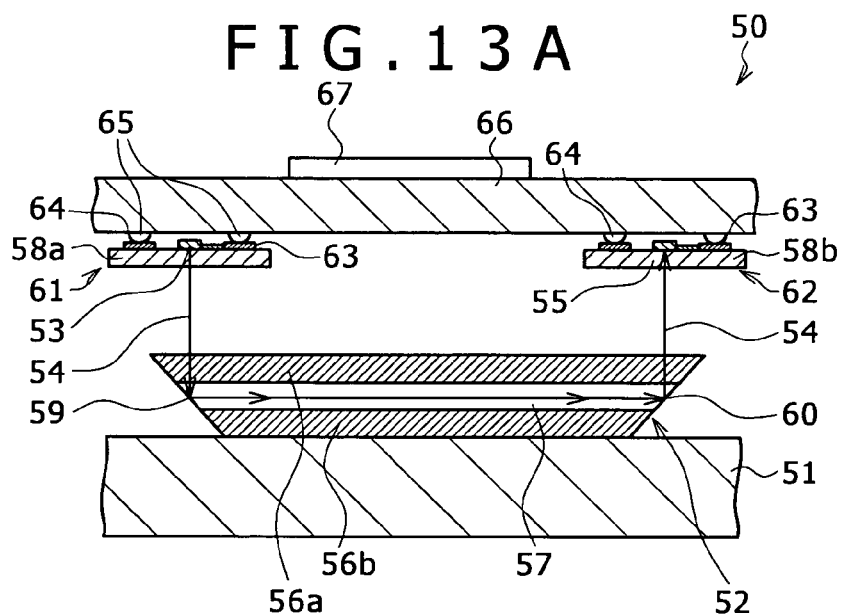
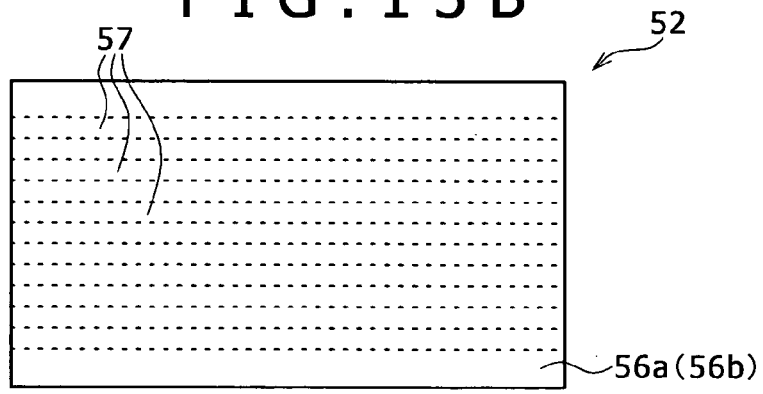
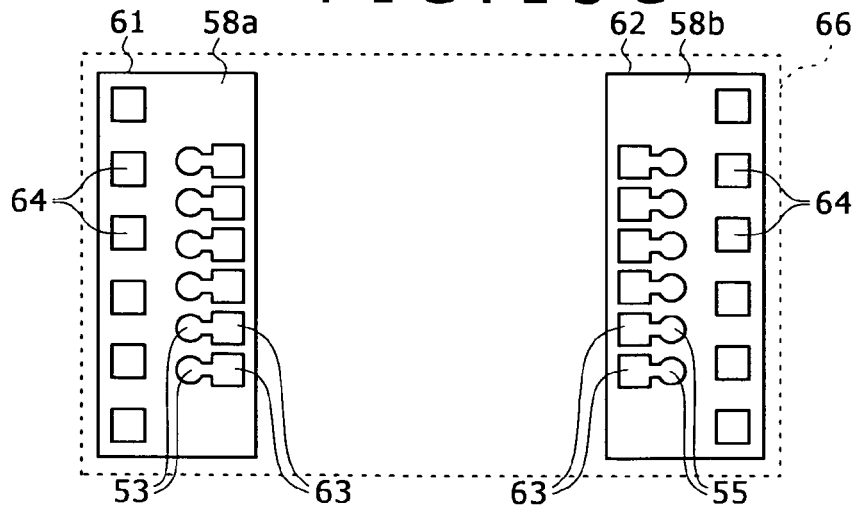

PHOTOELECTRIC TRANSDUCER AND PHOTOELECTRIC TRANSDUCER ELEMENT ARRAY

The present application claims priority to Japanese Patent Application JP2004-215340, filed in the Japanese Patent Office Jul. 23, 2004; the entire contents of which is incorporated herein by reference.

BACKGROUND OF THE INVENTION

The present invention relates to a photoelectric transducer and a photoelectric transducer element array.

At present, signals that are propagated between semiconductor chips such as LSI (Large Scale Integration) chips or the like are in the form of electric signals transmitted through substrate interconnections. As MPUs available today are becoming higher and higher in functionality, the amount of data exchanged between semiconductor chips grows to such an extent that various high-frequency problems have arisen with respect to the data. Typical examples of those problems include RC signal delay, impedance mismatching, EMC/EMI, crosstalk, etc.

Attempts have been made in the electronic packaging technology and related fields of art to solve the above problems by way of optimization of interconnection layouts, development of new materials, etc.

However, the attempts to optimize interconnection layouts and develop new materials are being hampered by limitations due to material properties. For achieving higher system functionality, it is necessary to reconsider the structure itself of printed-wiring boards that are designed for mounting simple semiconductor chips thereon. There have been proposed in recent years various fundamental solutions to the above problems. Typical proposals will be described below.

Fine Interconnections Based on Multichip Modules (MCM):

A high-functionality chip is mounted on a precision mounting board of ceramics and silicon, and fine interconnections which could not be formed on mother boards (multilayer printed boards) are realized on the precision mounting board. The interconnections thus formed have a reduced pitch, allowing buses to have a larger width for transmitting a much larger amount of data.

Electric Interconnections on Various Sealed and Integrated Semiconductor Chips:

Various semiconductor chips are two-dimensionally sealed and integrated by polyimide resin, and fine interconnections are formed on the integrated board. The interconnections thus formed have a reduced pitch, allowing buses to have a larger width for transmitting a much larger amount of data.

Three-Dimensional Coupling of Semiconductor Chips:

Through electrodes are formed in various semiconductor chips, and the semiconductor chips are stacked into a multilayer structure. The semiconductor chips are interconnected by the through electrodes which provide physically short interconnections. The physically short interconnections are effective to avoid problems such as signal delays. However, the multilayer structure tends to produce a large amount of heat and develop thermal stresses between the semiconductor chips.

To send and receive signals at higher speeds for the transmission of larger amounts of data, there has been developed an optical transmission coupling technology employing optical interconnections. For details, see Nikkei Electronics, "Encounter with optical interconnections", Dec. 3, 2001, pages 122, 123, 124, 125, FIGS. 4, 5, 6, 7, and NTT R&D, vol. 48, no. 3, pages 271-280 (1999), for example. Optical interconnections are applicable to various locations such as between electronic devices, between boards in electronic devices, and between chips in boards.

For example, as shown in FIG. 13A of the accompanying drawings, a conventional photoelectric transducer 50 has an optical waveguide 52 mounted on a printed-wiring board 51, a plurality of light-emitting devices 53 each including a surface emitting laser, for example, and a plurality of light-detecting devices 55 each including a photodiode. Light 54, e.g., a laser beam, that is modulated with a signal by each of the light-emitting devices 53 is applied to the optical waveguide 52. The light 54 is guided through the optical waveguide 52, and emitted from the optical waveguide 52 and detected by each of the light-detecting devices 55. The photoelectric transducer 50 provides an optical transmission-communication system which employs the optical waveguide 52 as a transmission path for a signal-modulated laser beam or the like.

The optical waveguide 52 includes a pair of cladding layers 56a, 56b and a core layer 57 sandwiched between the cladding layers 56a, 56b. As shown in FIG. 13B of the accompanying drawings, the optical waveguide 52 actually has a plurality of parallel core layers 57 sandwiched between the cladding layers 56a, 56b.

As shown in FIG. 13C of the accompanying drawings, the light-emitting devices 53 and the light-detecting devices 55 are mounted respectively on substrates 58a, 58b in alignment with entrance ends 59 and exit ends 60 of the core layers 57, providing a light-emitting device array 61 and a light-detecting device array 62. Anode electrodes 63 are electrically connected respectively to the light-emitting devices 53, and cathode electrodes 64 are associated with respective pairs of the light-emitting devices 53 and the anode electrodes 63. Similarly, anode electrodes 63 are electrically connected respectively to the light-detecting devices 55, and cathode electrodes 64 are associated with respective pairs of the light-detecting devices 55 and the anode electrodes 63.

The anode electrodes 63 and the cathode electrodes 64 of the light-emitting device array 61 and the anode electrodes 63 and the cathode electrodes 64 of the light-detecting device array 62 are electrically connected through solder bumps 65 to a drive circuit 67 mounted on an interposer board 66.

In the conventional photoelectric transducer 50 shown in FIGS. 13A through 13C, the cathode electrodes 64 are associated with respective the pairs of the light-emitting devices 53 and the anode electrodes 63, and the cathode electrodes 64 are associated with respective the pairs of the light-detecting devices 55 and the anode electrodes 63. The cathode electrodes 64 are electrically connected to respective terminals (not shown) of the interposer board 66 by the solder bumps 65. It is necessary that adjacent two of the cathode electrodes 64 be spaced apart from each other to keep adjacent two of the solder bumps 65 from overlapping each other when they are connected. Therefore, the boards 58a, 58b need to have a wide area, making it difficult to reduce the sizes of the light-emitting device array 61 and the light-detecting device array 62, and resulting in an increase in the cost thereof.

SUMMARY OF THE INVENTION

It is an object of the present invention to provide a photoelectric transducer and a photoelectric transducer element array which are of reduced size and cost.

According to the present invention, there is provided a photoelectric transducer including an optical waveguide and a photoelectric transducer element array of photoelectric transducer elements optically coupled to the optical waveguide, wherein the photoelectric transducer element array has a common conductive layer, the photoelectric transducer elements being mounted on the common conductive layer in alignment with entrance or exit ends of the optical waveguide, the photoelectric transducer elements having respective first poles, the photoelectric transducer element array having a second pole disposed in opposite relation to the first poles and connected as a reference potential setting electrode through the common conductive layer to at least two of the photoelectric transducer elements.

According to the present invention, there is also provided a photoelectric transducer element array including a common conductive layer and a plurality of photoelectric transducer elements mounted on the common conductive layer, the photoelectric transducer elements having respective first poles, the photoelectric transducer element array having a second pole disposed in opposite relation to the first poles and connected as a reference potential setting electrode through the common conductive layer to at least two of the photoelectric transducer elements.

With the conventional photoelectric transducer, as described above, the cathode electrodes 64 are associated with respective pairs of the light-emitting devices 53 (or the light-detecting devices 55) and the anode electrodes 63 (see FIGS. 13A through 13C), so that adjacent ones of the cathode electrodes need to be spaced apart from each other. According to the present invention, however, the photoelectric transducer elements are mounted on the common conductive layer in alignment with the entrance or exit ends of the optical waveguide, and the photoelectric transducer element array has the second pole disposed in opposite relation to the first poles of the photoelectric transducer elements and connected as the reference potential setting electrode through the common conductive layer to at least two of the photoelectric transducer elements. Consequently, it is not necessary to take into account the distance between two adjacent second poles, and the area of the conductive layer that is used to support the second pole is reduced. The photoelectric transducer and the photoelectric transducer element array can thus be reduced in size and cost.

According to the present invention, preferably, adjacent ones of the entrance or exit ends of the optical waveguide are disposed in different positions in an axial direction of the optical waveguide along which signal light is guided, and adjacent ones of the photoelectric transducer elements are disposed in different positions along the photoelectric transducer element array.

The optical waveguide may be integrated at an increased level while allowing adjacent ones of the photoelectric transducer elements to be spaced at such a pitch as to avoid signal crosstalk due to optical interference and device heating. As the photoelectric transducer elements are arranged two-dimensionally while integrating the optical waveguide at a high level, dead spaces in the photoelectric transducer are reduced and the area of the conductive layer which is dedicated to the installation of each photoelectric transducer element is reduced. Accordingly, the cost of the photoelectric transducer and the photoelectric transducer element array is further reduced.

Preferably, the photoelectric transducer element array has an electrode layer disposed on the conductive layer and extending from an outer junction terminal of the second pole in a peripheral area of the photoelectric transducer elements. The electrode layer should preferably be disposed substantially fully in the peripheral area or formed as a linear pattern surrounding each of the photoelectric transducer elements.

The photoelectric transducer elements which are arranged in the arrays tend to cause crosstalk (mutual interference) of electric signals that flow respectively through the photoelectric transducer elements in a high-frequency range. However, the electrode layer extending from the outer junction terminal of the second pole is effective to terminate electromagnetic waves in the high-frequency range, thereby reducing electric signal crosstalk between the photoelectric transducer elements. This allows the photoelectric transducer elements to be integrated at a higher level.

As the temperature of the photoelectric transducer elements increases, the high-speed photoelectric conversion capability thereof is likely to decrease. With the electrode layer extending from the outer junction terminal of the second pole in the peripheral area of the photoelectric transducer elements according to the present invention, however, the heat radiation capability is increased, making it less likely for the temperature of the photoelectric transducer elements to rise. Therefore, it is possible to design the photoelectric transducer elements in a more highly integrated structure.

Because the photoelectric transducer elements are arranged in the two-dimensional arrays and the second pole is shared by the photoelectric transducer elements, drive currents of the photoelectric transducer elements that are positioned on inner and outer sides of the conductive layer concentrate on the second pole that is positioned outside of the array. The current concentration results in different drive efficiencies of outermost ones of the photoelectric transducer elements and inner ones of the photoelectric transducer elements, lowering the total characteristics and reliability of the photoelectric transducer element array. Since the second pole and the photoelectric transducer elements are connected by the electrode layer of lower resistance, variations of the modulating characteristics are reduced, allowing the photoelectric transducer elements to be integrated at a higher level.

As the photoelectric transducer elements can be integrated at a higher level, the area of the conductive layer which is occupied by one of the photoelectric transducer elements is reduced, resulting in a further reduction in the cost of the photoelectric transducer. Inasmuch as the area of the conductive layer is reduced, variations of the lengths of signal interconnections from LSI chips and variations of the lengths of interconnections between the photoelectric transducer elements are also reduced. Therefore, interconnection skews in the overall system are reduced, making it possible to modulate signals at higher frequencies.

Preferably, the conductive layer includes a semiconductor layer of GaAs, AlGaAs, or the like, and the photoelectric transducer elements include a semiconductor and are disposed on the conductive layer. The second pole is made of metal such as gold, copper, aluminum, or the like.

Preferably, the photoelectric transducer elements are optically coupled to an optical waveguide through the conductive layer.

Preferably, the photoelectric transducer or the photoelectric transducer element array further includes an interposer board and a drive circuit mounted on the interposer board for energizing the photoelectric transducer elements, the first poles and the second pole being connected to the drive circuit through the interposer board.

Preferably, the photoelectric transducer element array is constructed as a light-emitting device array or a light-detecting device array. Each of the photoelectric transducer elements may be a light-emitting device such as a laser or the like, or a light-detecting device such as a photodiode or the like.

In the photoelectric transducer, the optical waveguide preferably includes a cladding layer and a plurality of core layers disposed in the cladding layer. The core layers serve to guide signal light introduced thereinto, and the cladding layer serves to confine the signal light within the core layers. The core layers are made of a material having a high refractive index, and the cladding layer is made of a material having a refractive index smaller than the material of the core layers.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 13A through 13C are views showing a conventional optical transmission-communication system which employs an optical waveguide.

DETAILED DESCRIPTION OF THE PREFERRED EMBODIMENTS

Figure 1A:
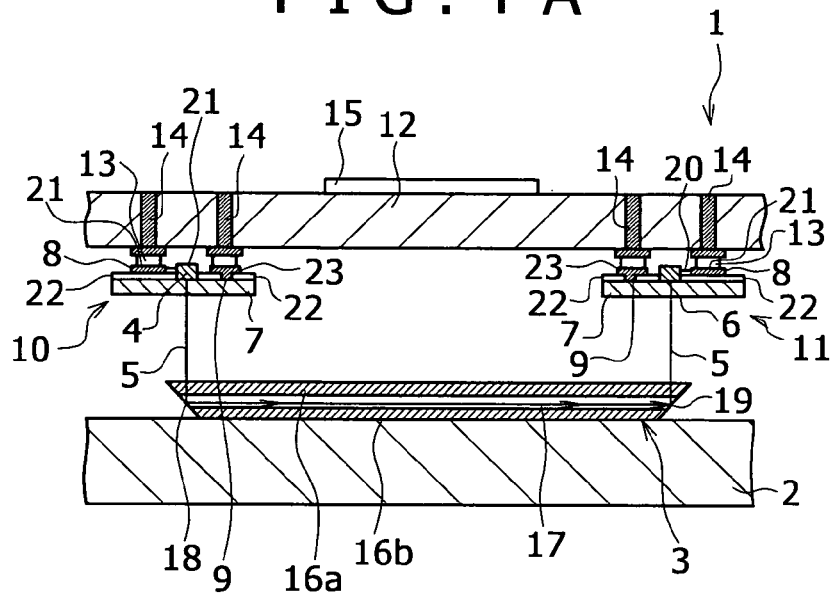
FIGS. 1A through 1C are views showing a photoelectric transducer and a photoelectric transducer element array according to a first embodiment of the present invention.

Like or corresponding parts are denoted by like or corresponding reference characters throughout drawings.

First Embodiment

A photoelectric transducer according to the present invention has an optical waveguide and a photoelectric transducer array including a plurality of photoelectric transducer elements, the optical waveguide and the photoelectric transducer array being optically coupled to each other.

Figure 1B:
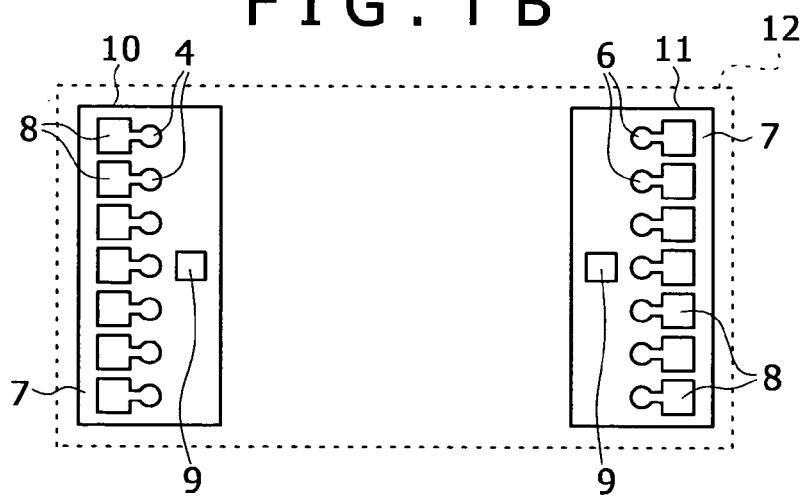
Figure 1C:
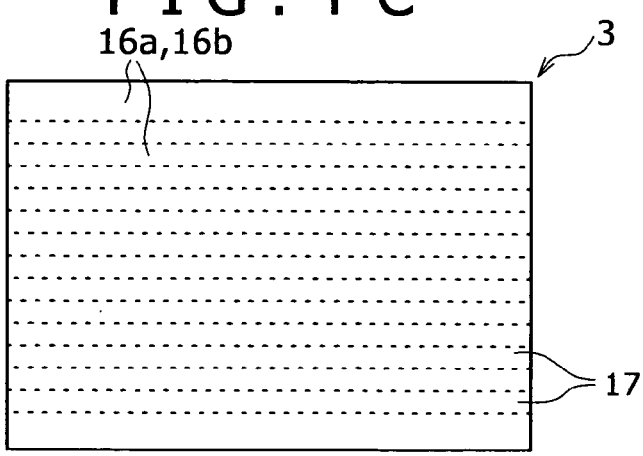

FIGS. 1A through 1C schematically shows a photoelectric transducer and a photoelectric transducer element array according to the present invention. As shown in FIG. 1A, a photoelectric transducer 1 according to the first embodiment has an optical waveguide 3 mounted on a printed-wiring board 2, a plurality of light-emitting devices 4 each including a surface emitting laser, for example, having a device area represented by a width of 300 μm and a depth of 200 μm, and a plurality of light-detecting devices 6 each including a photodiode. Light 5, e.g., a laser beam, that is modulated with a signal by each of the light-emitting devices 4 is applied to the optical waveguide 3. The light 5 is guided through the optical waveguide 3, and emitted from the optical waveguide 3 and detected by each of the light-detecting devices 6. The photoelectric transducer 1 provides an optical transmission-communication system which employs the optical waveguide 3 as a transmission path for a signal-modulated laser beam or the like.

As shown in FIGS. 1A and 1B, the light-emitting devices 4 and the light-detecting devices 6 are disposed on respective common conductive layers 7. The light-emitting devices 4 and the light-detecting devices 6 have respective first poles 8, e.g., electrodes of gold having a resistivity of 2.4 Ω·m and a thickness of 2 μm. Two second poles 9 shared respectively by the light-emitting devices 4 and the light-detecting devices 6 are positioned as reference potential setting poles in opposite relation to the first poles 8 across the light-emitting devices 4 and the light-detecting devices 6. The second poles 9 are mounted on the respective common conductive layers 7 and connected respectively to at least two of the light-emitting devices 4 and the light-detecting devices 6 through the respective common conductive layers 7.

The conductive layers 7 are each in the form of a semiconductor layer of GaAs, AlGaAs, or the like and have a thickness of 5 μm. The light-emitting devices 4 and the light-detecting devices 6 that are disposed on the conductive layers 7 are made of a semiconductor. The second poles 9 are made of a metal such as Au, Cu, Al, or the like.

The photoelectric transducer element array according to the present invention is constructed as a light-emitting device array 10 made up of the light-emitting devices 4 or a light-detecting device array 11 made up of the light-detecting devices 6.

The first and second poles 8, 9 of the light-emitting device array 10 and the first and second poles 8, 9 of the light-detecting device array 11 are disposed in confronting relation to each other on an interposer board 12 which has a thickness of 1.8 mm and a dielectric constant of 5.3, for example. The light-emitting device array 10 and the light-detecting device array 11 are mounted on the interposer board 12 by solder bumps 13 such as solder balls of SnAgCu having a resistivity of 15 Ω·m, a diameter of about 80 μm, and a height of about 3 μm. The interposer board 12 has through vias 14 connected to the light-emitting devices 4 and the light-detecting devices 6. The through vias 14 include electrodes of sintered copper having a resistivity of 4.5 Ω·m, a via diameter of 50 μm, a pad diameter of 80 μm, and a pad thickness of 100 μm. The interposer board 12 also has interconnections (not shown) and a drive circuit 15. The gaps between the interposer board 12 and the light-emitting and light-detecting device arrays 10, 11 should preferably be filled with an underfiller such as an epoxy underfiller having a dielectric constant of 3.5.

The light-emitting devices 4 and the light-detecting devices 6 may be combined with respective lenses (not shown) for emitting and detecting light efficiently.

As shown in FIGS. 1A and 1C, the optical waveguide 3 includes a pair of cladding layers 16a, 16b and a core layer 17 sandwiched between the cladding layers 16a, 16b. The core layer 17 serves to guide signal light 5 introduced thereinto, and the cladding layers 16a, 16b serve to confine the signal light 5 within the core layer 17. The core layer 17 is made of a material having a high refractive index, and the cladding layers 16a, 16b are made of a material having a refractive index smaller than the material of the core layer 17. Lenses (not shown) may be disposed on the cladding layer 16a at positions in alignment with entrance ends 18 and exit ends 19 of the core layer 17.

As shown in FIG. 1C, the optical waveguide 3 actually has a plurality of parallel core layers 17 sandwiched between the cladding layers 16a, 16b. The entrance ends 18 and exit ends 19 of the core layers 17 should desirably have inclined mirror surfaces inclined at 45° to the axes of the core layers 17. The core layers 17 with the inclined mirror surfaces may be formed by injection molding. Since the inclined mirror surfaces may be formed by injection molding without the need for direct machining on the core layers 17, the core layers 17 are not damaged when fabricated, and the inclined mirror surfaces can be formed as smooth surfaces. The optical waveguide 3 can be fabricated easily in good quality with high accuracy. The inclined mirror surfaces on the entrance ends 18 and exit ends 19 of the core layers 17 allow the signal light 5 emitted as a laser beam from the light-emitting devices 4 to enter efficiently into the core layers 17, and also allow the signal light 5 that has been guided through the core layers 17 to be emitted from the core layers 17 to the light-detecting devices 6. The core layers 17 may be made of a known material such as an ultraviolet-curable resin, e.g., fluorinated polyimide or the like.

According to the first embodiment and other embodiments to be described later, the light-emitting and light-detecting device arrays 10, 11 and the optical waveguide 3 should preferably be optically coupled to each other through the conductive layer 7.

According to the first embodiment, the light-emitting devices 4 and the light-detecting devices 6 which are associated with the entrance ends 18 and the exit ends 19 of the optical waveguide 3 are disposed on the respective conductive layers 7, and the second poles 9 disposed in opposite relation to the first poles 8 of the light-emitting devices 4 and the light-detecting devices 6 and shared respectively by the light-emitting devices 4 and the light-detecting devices 6 are connected to at least two of the light-emitting devices 4 and the light-detecting devices 6 through the conductive layers 7. It is not necessary to take into account the distance between two adjacent second poles 9, and hence the light-emitting device array 10, the light-detecting device array 11, and hence the photoelectric transducer 1 may be reduced in size and cost.

Second Embodiment

According to a second embodiment of the present invention, as with the first embodiment shown in FIG. 1A, a photoelectric transducer 1 has an optical waveguide 3 mounted on a printed-wiring board 2, a plurality of light-emitting devices 4 each including a surface emitting laser, for example, and a plurality of light-detecting devices 6 each including a photodiode. Light 5, e.g., a laser beam, that is modulated with a signal by each of the light-emitting devices 4 is applied to the optical waveguide 3. The light 5 is guided through the optical waveguide 3, and emitted from the optical waveguide 3 and detected by each of the light-detecting devices 6. The photoelectric transducer 1 provides an optical transmission-communication system which employs the optical waveguide 3 as a transmission path for a signal-modulated laser beam or the like.

Figure 2A:
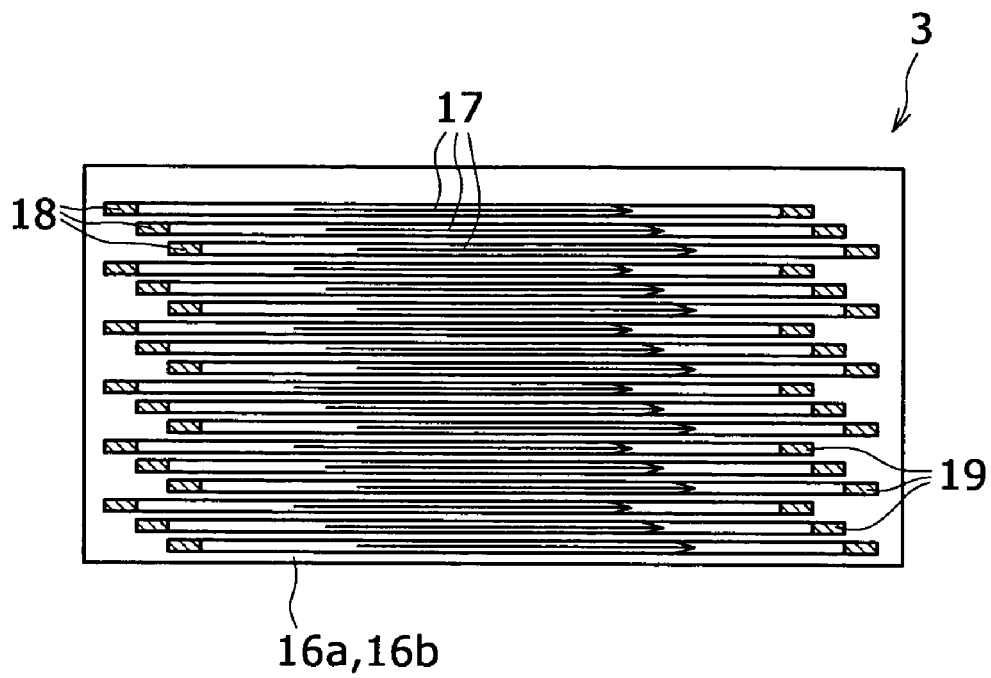
FIGS. 2A and 2B are views showing a photoelectric transducer and a photoelectric transducer element array according to a second embodiment of the present invention.

As shown in FIG. 2A, the entrance ends 18 and the exit ends 19 of adjacent ones of the core layers 17 are disposed in different positions, i.e., staggered in position, in the axial direction of the optical waveguide 3 along which signal light is guided. The optical waveguide 3 of the above structure can be fabricated by a radiation lithographic process, for example.

Figure 2B:
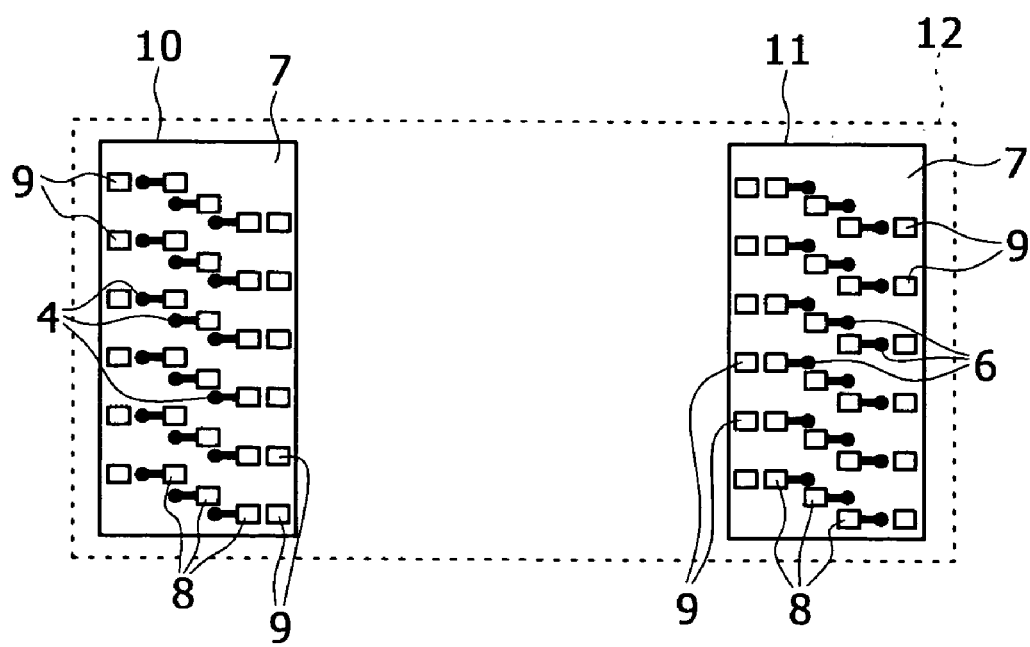

As shown in FIG. 2B, a light-emitting device array 10 and a light-detecting device array 11 are made up of light-emitting devices 4 and light-detecting devices 6, respectively, disposed on respective common conductive layers 7, and second poles 9 disposed in opposite relation to first poles 8 of the light-emitting devices 4 and the light-detecting devices 6 and shared respectively by the light-emitting devices 4 and the light-detecting devices 6 are connected to at least two of the light-emitting devices 4 and the light-detecting devices 6 through the conductive layers 7. Adjacent ones of the light-emitting devices 4 and the light-detecting devices 6 are disposed in different positions, i.e., staggered in position, in the direction of the arrays in alignment with the respective core layers 17 of the optical waveguide 3.

The photoelectric transducer 1 according to the second embodiment offers the same advantages as the photoelectric transducer 1 according to the first embodiment. The core layers 17 may be integrated at an increased level while allowing adjacent ones of the light-emitting devices 4 and the light-detecting devices 6 to be spaced at such a pitch as to avoid signal crosstalk due to optical interference and device heating. As the light-emitting devices 4 and the light-detecting devices 6 are arranged two-dimensionally while integrating the core layers 17 at a high level, dead spaces in the photoelectric transducer 1 are reduced and the area of each of the conductive layers 7 which is dedicated to the installation of each device is reduced. Accordingly, the cost of the photoelectric transducer 1 is further reduced.

Third Embodiment

According to a third embodiment of the present invention, as with the first embodiment shown in FIG. 1A, a photoelectric transducer 1 has an optical waveguide 3 mounted on a printed-wiring board 2, a plurality of light-emitting devices 4 each including a surface emitting laser, for example, and a plurality of light-detecting devices 6 each including a photodiode. Light 5, e.g., a laser beam, that is modulated with a signal by each of the light-emitting devices 4 is applied to the optical waveguide 3. The light 5 is guided through the optical waveguide 3, and emitted from the optical waveguide 3 and detected by each of the light-detecting devices 6. The photoelectric transducer 1 provides an optical transmission-communication system which employs the optical waveguide 3 as a transmission path for a signal-modulated laser beam or the like.

Figure 3A:
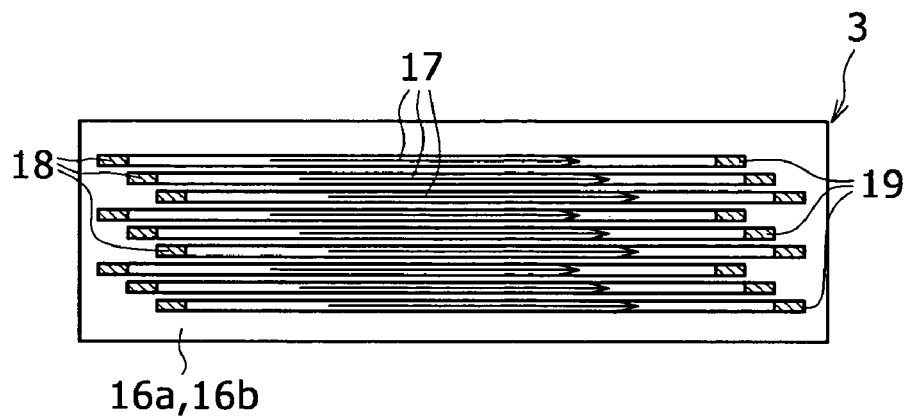
FIGS. 3A through 3C are views showing a photoelectric transducer and a photoelectric transducer element array according to a third embodiment of the present invention, FIG. 3C being a cross-sectional view taken along line A-A' of FIG. 3B.

As shown in FIG. 3A, the entrance ends 18 and the exit ends 19 of adjacent ones of the core layers 17 are disposed in different positions, i.e., staggered in position, in the axial direction of the optical waveguide 3 along which signal light is guided. The optical waveguide 3 of the above structure can be fabricated by a radiation lithographic process, for example.

Figure 3B:
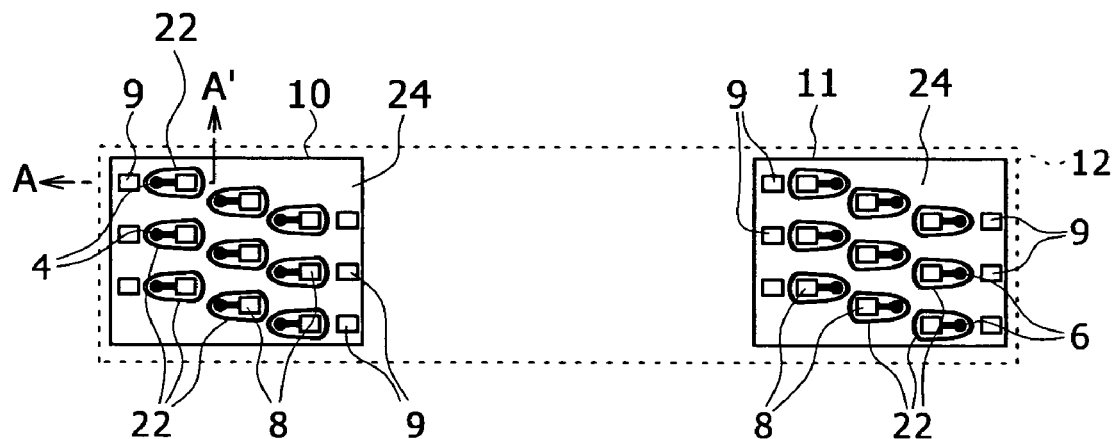
Figure 3C:
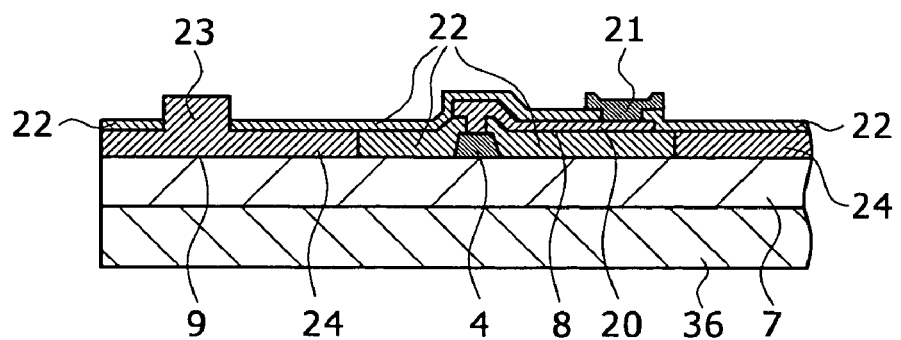

As shown in FIGS. 3B and 3C, a light-emitting device array 10 and a light-detecting device array 11 are made up of light-emitting devices 4 of p-AlGaAs, for example, and light-detecting devices 6, respectively, disposed on respective common conductive layers 7 each having an n-AlGaAs substrate having a thickness of 5 μm, and second poles 9 disposed in opposite relation to first poles 8 of the light-emitting devices 4 and the light-detecting devices 6 and shared respectively by the light-emitting devices 4 and the light-detecting devices 6 are connected to at least two of the light-emitting devices 4 and the light-detecting devices 6 through the conductive layers 7. Adjacent ones of the light-emitting devices 4 and the light-detecting devices 6 are disposed in different positions, i.e., staggered in position, in the direction of the arrays in alignment with the respective core layers 17 of the optical waveguide 3. The conductive layers 7 are formed on a synthetic quartz substrate 36 having a thickness of 500 μm. The first poles 8 have electrodes 20 of gold having a resistivity of 2.4 Ω·m and a thickness of 2 μm, the electrodes 20 of gold being connected to the light-emitting devices 4 and the light-detecting devices 6. Solder posts 21 of nickel having a resistivity of 6.84 Ω·m, a diameter of about 80 μm, and a height of about 3 μm are mounted on the electrodes 20 of gold for connection to the interposer board 12.

The photoelectric transducer 1 according to the third embodiment offers the same advantages as the photoelectric transducer 1 according to the first embodiment. The core layers 17 may be integrated at an increased level while allowing adjacent ones of the light-emitting devices 4 and the light-detecting devices 6 to be spaced at such a pitch as to avoid signal crosstalk due to optical interference and device heating. As the light-emitting devices 4 and the light-detecting devices 6 are arranged two-dimensionally while integrating the core layers 17 at a high level, dead spaces in the photoelectric transducer 1 are reduced and the area of each of the conductive layers 7 which is dedicated to the installation of each device is reduced. Accordingly, the cost of the photoelectric transducer 1 is further reduced.

On each of the conductive layers 7, an electrode layer 24 made of gold having a resistivity of 2.4 Ω·m and a thickness of 5 μm, a width of 85 μm, and a depth of 70 μm, or made of copper, aluminum, or the like extends from an outer junction terminal 23 of the second pole 9 in a peripheral area including insulating films 22, e.g., polyimide insulating films having a thickness of 5 μm and a dielectric constant of 3.2, of the light-emitting devices 4 or the light-detecting devices 6. Specifically, the electrode layer 24 is formed substantially entirely in the peripheral area.

The light-emitting devices 4 and the light-detecting devices 6 which are arranged in the arrays tend to cause crosstalk (mutual interference) of electric signals that flow respectively through the light-emitting devices 4 and the light-detecting devices 6 in a high-frequency range. However, the electrode layer 24 extending from the outer junction terminal 23 of the second pole 9 is effective to terminate electromagnetic waves in the high-frequency range, thereby reducing electric signal crosstalk between the light-emitting devices 4 and the light-detecting devices 6. This allows the light-emitting devices 4 and the light-detecting devices 6 to be integrated at a higher level.

As the temperature of the light-emitting devices 4 and the light-detecting devices 6 increases, the high-speed photoelectric conversion capability thereof is likely to decrease. According to general data, the modulation efficiency of the light-emitting devices 4 and the light-detecting devices 6 in the GHz band start to be lowered in a high-temperature environment at 80° C. or higher. With the electrode layer 24 extending from the outer junction terminal 23 of the second pole 9 in the peripheral area of the light-emitting devices 4 and the light-detecting devices 6, however, the heat radiation capability (thermal conductivity) is increased, making it less likely for the temperature of the light-emitting devices 4 and the light-detecting devices 6 to rise. Therefore, it is possible to design the light-emitting devices 4 and the light-detecting devices 6 in a more highly integrated structure. The thermal conductivities of gold, copper, and aluminum for use as the material of electrode layer 24, and the thermal conductivities of silicon and GaAs for use as the material of the substrate (conductive layers 7) are shown below for reference. It can be seen that the electrode layer 24 of gold or the like which is mounted on the conductive layers 7 of GaAs or the like provides a thermal conductivity that is about 20 times higher than if the electrode layer 24 were not provided.

Si: 168 (W/mk)
GaAs: 17.8 (W/mk)
Au: 320 (W/mk)
Cu: 390 (W/mk)
Al: 240 (W/mk)

Because the light-emitting devices 4 and the light-detecting devices 6 are arranged in the two-dimensional arrays and the second poles 9 are shared by the light-emitting devices 4 and the light-detecting devices 6, drive currents of the light-emitting devices 4 and the light-detecting devices 6 that are positioned on inner and outer sides of the conductive layers 7 concentrate on the second poles 9 that are positioned outside of the arrays. The current concentration results in different drive efficiencies of outermost ones of the light-emitting devices 4 and the light-detecting devices 6 and inner ones of the light-emitting devices 4 and the light-detecting devices 6, lowering the total characteristics and reliability of the light-emitting device array 10 and the light-detecting device array 11. According to the third embodiment, since the second poles 9 and the light-emitting devices 4 and the light-detecting devices 6 are connected by the electrode layers 24 extending from the outer junction terminals 23 of the second poles 9 of lower resistance, variations of the modulating characteristics are reduced, allowing the light-emitting devices 4 and the light-detecting devices 6 to be integrated at a higher level.

As the light-emitting devices 4 and the light-detecting devices 6 can be integrated at a higher level, the area of each of the conductive layers 7 which is occupied by one of the light-emitting devices 4 and the light-detecting devices 6 is reduced, resulting in a further reduction in the cost of the photoelectric transducer. Inasmuch as the area of each of the conductive layers 7 is reduced, variations of the lengths of signal interconnections from LSI chips and variations of the lengths of interconnections between the light-emitting devices 4 and the light-detecting devices 6 are also reduced. Therefore, interconnection skews in the overall system are reduced, making it possible to modulate signals at higher frequencies.

Figure 4:
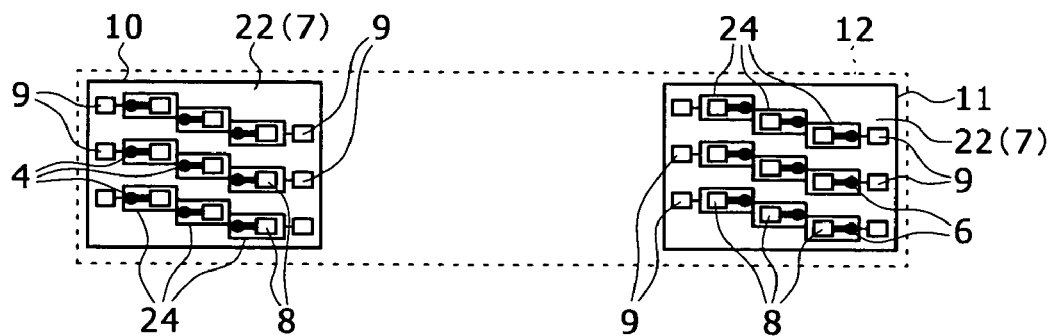
FIG. 4 is a schematic plan view of a photoelectric transducer element array according to a fourth embodiment of the present invention.

When the electrode layer 24 extending from the outer junction terminal 23 of the second pole 9 is to be formed in the peripheral area including the insulating films 22 of the light-emitting devices 4 or the light-detecting devices 6 on each of the conductive layers 7, the electrode layer 24 may be formed as a linear pattern surrounding the light-emitting devices 4 or the light-detecting devices 6 in the peripheral area, as shown in FIG. 4.

Fourth Embodiment

A photoelectric transducer according to the present invention has photoelectric transducer arrays and an optical waveguide disposed in confronting relation to the photoelectric transducer arrays. The photoelectric transducer may have any of various different structures within the scope of the present invention. For example, the photoelectric transducer may be of a structure having a socket and an optical waveguide disposed in the socket.

Figure 5A:
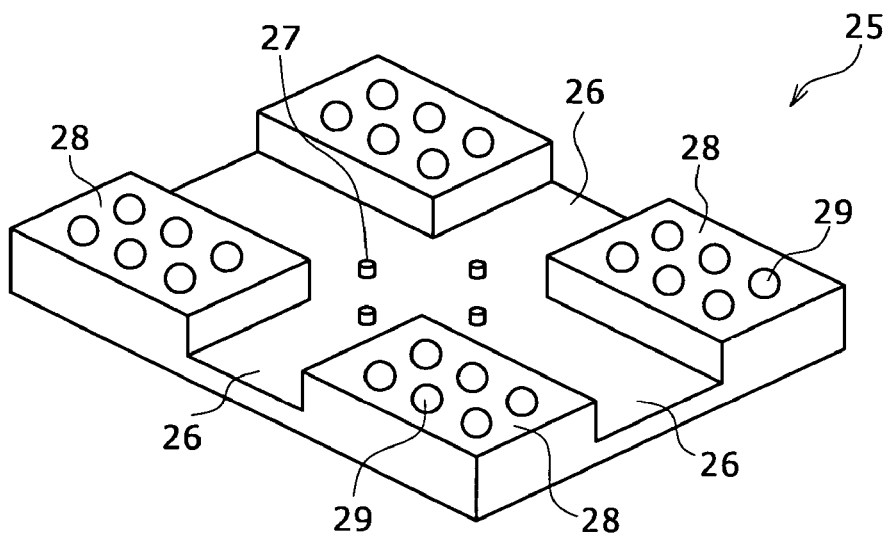
FIGS. 5A and 5B are perspective views of a socket according to a fifth embodiment of the present invention.
Figure 5B:
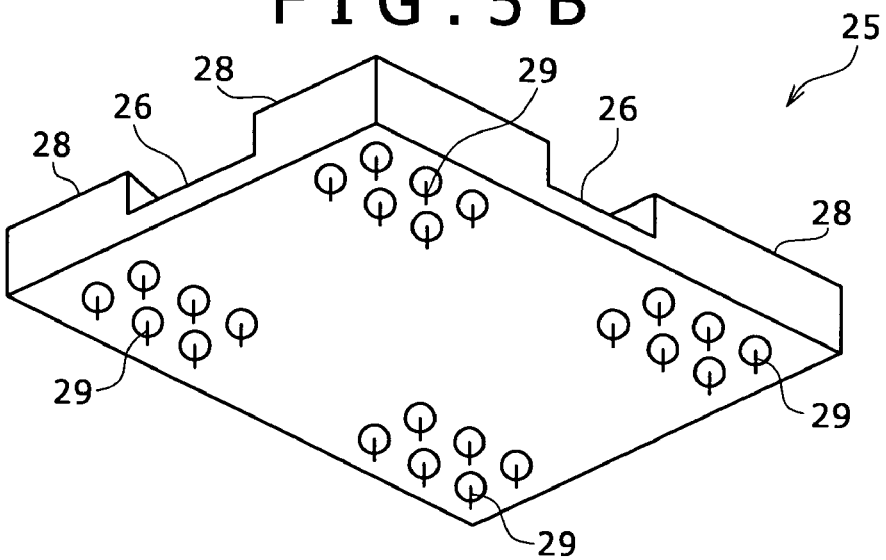

FIGS. 5A and 5B are perspective views of a socket 25 according to the present invention. FIG. 5A shows a surface of the socket where an optical waveguide is to be installed, and FIG. 5B shows an opposite surface of the socket.

As shown in FIGS. 5A and 5B, the socket 25 has a positioning unit including an indented structure for positioning and fixing an optical waveguide. Specifically, the indented structure has recesses 26 for receiving the optical waveguide fitted therein and transversely positioning the optical waveguide, and pins 27 for longitudinally positioning the optical waveguide. The recesses 26 have a depth greater than the thickness of the optical waveguide.

The indented structure also has lands 28 having conductive elements, e.g., terminal pins 29, for electrically connecting the face and reverse sides of the socket 25. An interposer board having photoelectric transducer element arrays according to the present invention is fixedly mounted on the lands 28 of the indented structure.

The socket 25 may be made of any of various known insulating resin materials. For example, the socket 25 may be made of PES (Polyethylene Sulfide) containing glass, PET (Polyethylene Terephthalate) containing glass, or the like. There are available many types and many insulation and reliability data of such materials for the socket 25, and many manufacturers of such materials. Therefore, the socket 25 is easily acceptable with regard to its functions, cost, and reliability, and is highly compatible with the existing printed-wiring board mounting processes.

The socket 25 may be manufactured according to any various processes. For example, the socket 25 may easily be manufactured according to a molding process using a mold which is complementary in shape to the indented structure described above.

Figure 6A:
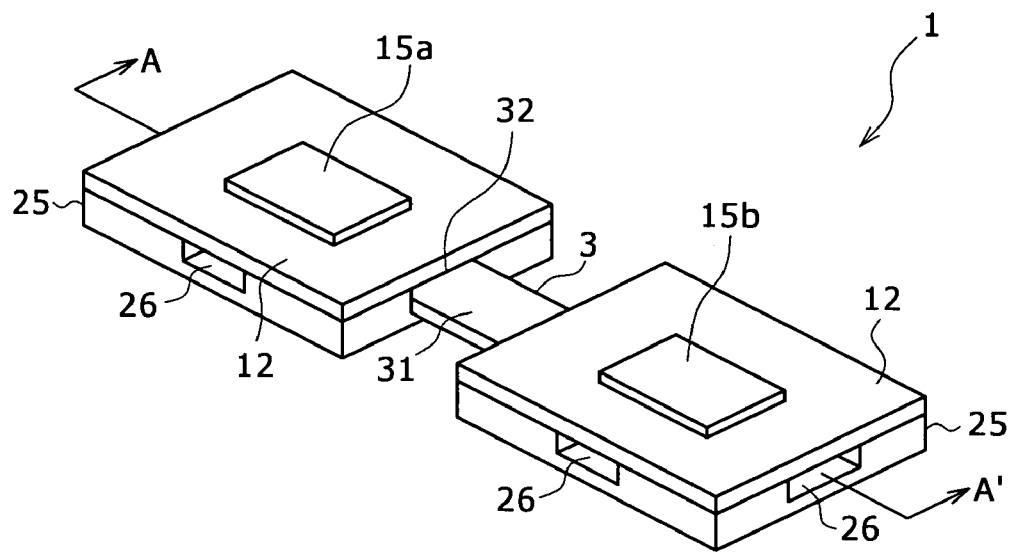
FIGS. 6A and 6B are perspective views of a photoelectric transducer which incorporates sockets according to the fifth embodiment of the present invention.
Figure 6B:
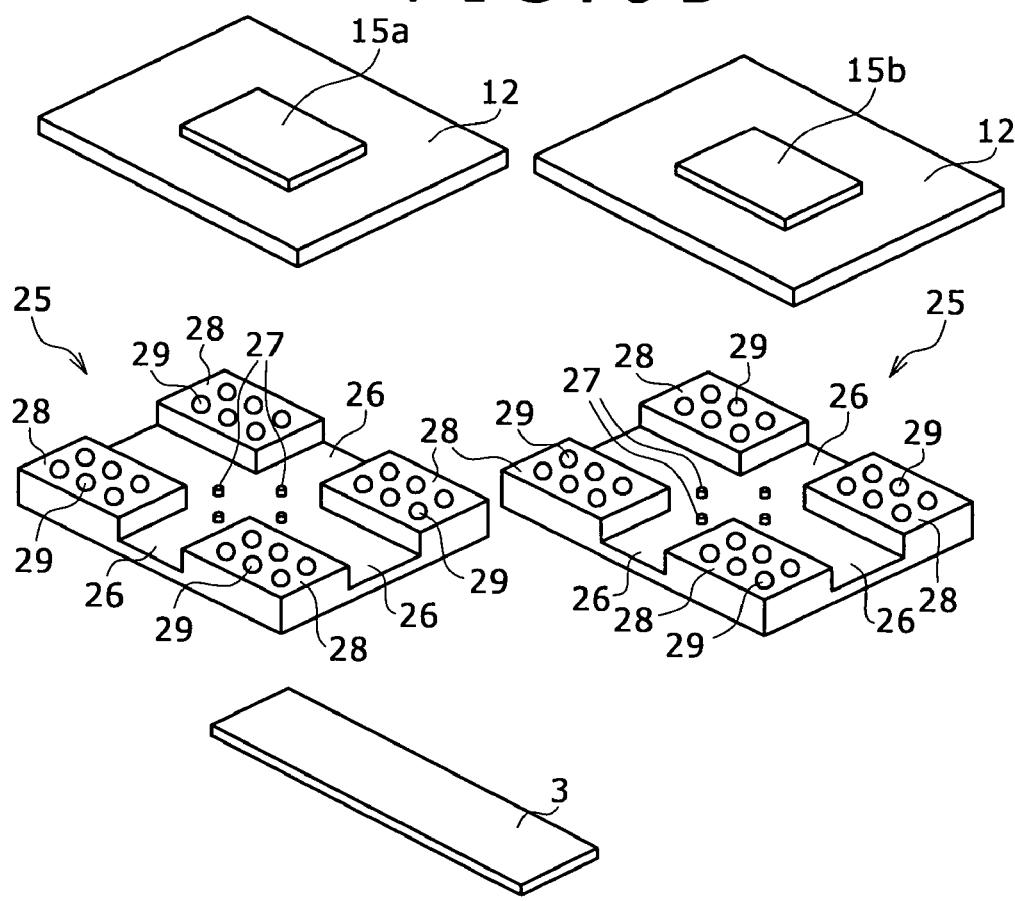

FIGS. 6A and 6B show a photoelectric transducer 1 which incorporates sockets 25 according to the present invention.

As shown in FIGS. 6A and 6B, the photoelectric transducer 1 has a pair of sockets 25 and an optical waveguide 3 mounted on and extending between the sockets 25. The optical waveguide 3 has a plurality of parallel core layers disposed therein. The optical waveguide 3 is held out of contact with printed-wiring boards, described later, and is effectively prevented from being broken by heat generated when the photoelectric transducer 1 is in use.

An interposer board 12 having photoelectric transducers element arrays according to the present invention is fixedly mounted on the lands 28 of the indented structure of each of the sockets 25. Photoelectric transducers element arrays 10 and/or 11 according to the present invention are mounted on one surface of the interposer board 12, and a drive circuit 15a or 15b is mounted on the opposite surface of the interposer board 12.

Figure 7A:
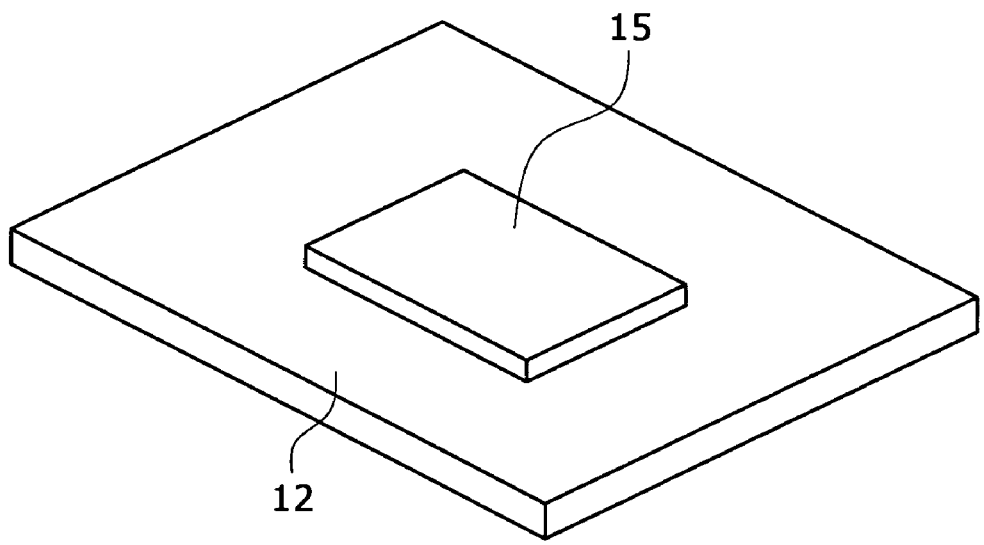
FIGS. 7A and 7B are perspective views of an interposer board according to the fifth embodiment of the present invention.
Figure 7B:
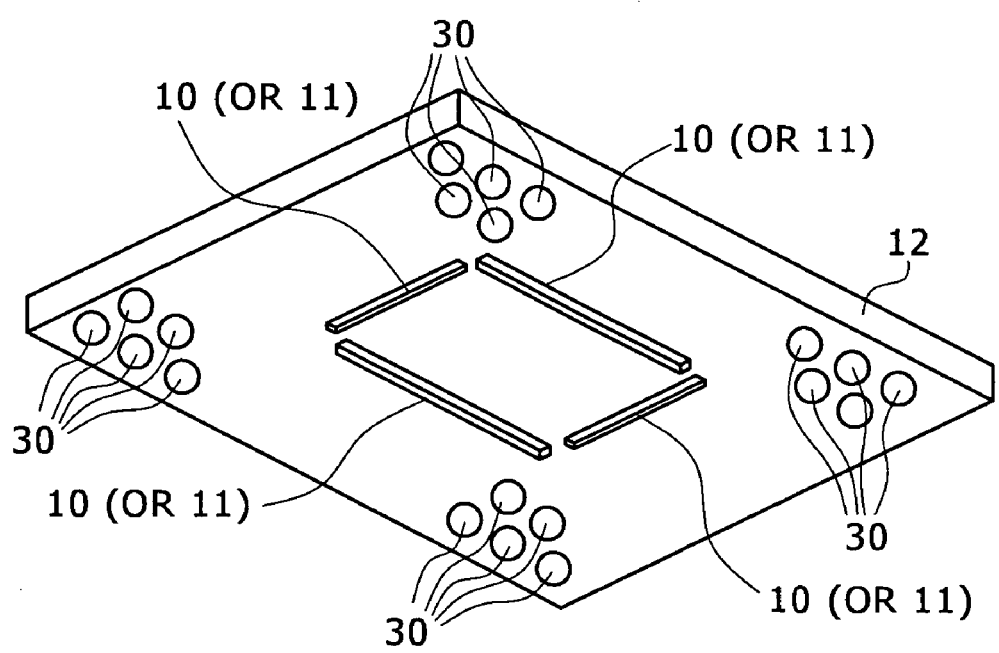

As shown in FIGS. 7A and 7B, a drive circuit 15 is mounted on one surface of each interposer board 12, and a light-emitting device array 10 or a light-detecting device array 11 as a photoelectric transducer element array according to the present invention is mounted on the opposite surface of the interposer board 12. Signal interconnection electrodes 30 are disposed on the interposer board 12 in a peripheral area thereof.

For securing the interposer board 12 to the sockets 25 with the optical waveguide 3 disposed in the recesses 26, the surface of the interposer board 12 on which the light-emitting device array 10 or the light-detecting device array 11 is mounted is placed in contact with the lands 28 of the indented structure of the socket 25. At this time, the terminal pins 29 of the socket 25 and the signal interconnection electrodes 30 on the interposer board 12 are electrically connected to each other.

Because the depth, e.g., 2 mm, of the recesses 26 is greater than the thickness, e.g., 1 mm, of the optical waveguide 3, a space or clearance 32 is formed between a surface 31 of the optical waveguide 3 and the interposer board 12, as shown in FIG. 6A.

As described above, the drive circuits 15a, 15b are mounted on the sockets 25 with the interposer boards 12 interposed therebetween, and the spaces or clearances 32 are formed between the surface 31 of the optical waveguide 3 and the interposer boards 12. With this arrangement, even when the drive circuits 15a, 15b are heated when the photoelectric transducer 1 is in use, the optical waveguide 3 is effectively prevented from being broken by the heat from the drive circuits 15a, 15b.

The photoelectric transducer 1 operates as follows: An electric signal transmitted from the drive circuit 15a on one of the interposer boards 12 is converted by a light-emitting device on the interposer board 12 into an optical signal, which is applied as a laser beam to the entrance end of a corresponding core layer of the optical waveguide 3. The optical signal is guided through the core layer along the optical waveguide 3 to the exit end of the core layer, from which the optical signal is emitted to and detected by a corresponding light-detecting device on the other interposer board 12. The light-detecting device converts the optical signal into an electric signal, which is transmitted to the drive circuit 15b on the interposer board 12.

The photoelectric transducer 1 provides an optical interconnection system which employs the optical waveguide 3 as optical interconnections. In such an application, the photoelectric transducer 1 is fixed in position while being electrically connected to a printed-wiring board.

According to the present embodiment, the photoelectric transducer element arrays 10, 11 have the light-emitting devices 4 and the light-detecting devices 6 which are associated with the entrance ends 18 and the exit ends 19 of the optical waveguide 3 and disposed on the respective common conductive layers 7, and the second poles 9 disposed in opposite relation to the first poles 8 of the light-emitting devices 4 and the light-detecting devices 6 and shared respectively by the light-emitting devices 4 and the light-detecting devices 6 are connected to at least two of the light-emitting devices 4 and the light-detecting devices 6 through the conductive layers 7. It is not necessary to take into account the distance between two adjacent second poles 9, and hence the light-emitting device array 10, the light-detecting device array 11, and hence the photoelectric transducer 1 may be reduced in size and cost.

Signal lines between the drive circuits 15a, 15b and the photoelectric transducer elements, i.e., the light-emitting devices 4 and the light-detecting devices 6, can be shorter and of equal lengths. Therefore, electric signals flowing between the drive circuits 15a, 15b and the photoelectric transducer elements are easily and reliably protected against noise and crosstalk, and can modulate the laser beams at an increased speed.

Inasmuch as the photoelectric transducer 1 can be electrically connected to the printed-wiring board with the optical waveguide 3 installed in the recesses 26 of the sockets 25, the mount structure of the existing printed-wiring board can directly be employed. If areas for installing the sockets 25 are provided on the printed-wiring board, then other general electric interconnections can be formed according to a conventional process.

Even if the optical waveguide 3 is vulnerable to high-temperature processes, since the optical waveguide 3 can be installed in the recesses 26 of the sockets 25 after the sockets 25 are fixed to the printed-wiring board and all mounting processes including high-temperature processes such as a solder reflow process and an underfiller resin sealing process are performed, the optical waveguide 3 can be mounted in position without being damaged by high temperatures.

The sockets 25 can be made of a synthetic resin which is more rigid than the printed-wiring board, and the light-emitting and light-detecting devices 4, 6 and the optical waveguide 3 can be optically connected on the sockets 25. Accordingly, it is easy to achieve a level of mounting accuracy which is required for optically coupling the light-emitting and light-detecting devices 4, 6 and the optical waveguide 3. For example, the assembling accuracy on the order of several μm can be achieved by the present molding technology. Consequently, it is possible to manufacture highly packed optical buses.

According to the conventional electric interconnection structures, an optical waveguide is directly mounted on a printed-wiring board. Therefore, as the number of pins and interconnections extending from the drive circuit 15 increases because of higher functionality of the drive circuit 15, the optical waveguide tends to reduce the freedom with which to design the printed-wiring board. It is thus difficult to design the printed-wiring board for higher functionality, with the result that more efforts are directed to SOC (system on chip) structures having all functions incorporated in one chip. According to the present invention, however, as the photoelectric transducer 1 can be electrically connected to the printed-wiring board with the optical waveguide 3 installed in the recesses 26 of the sockets 25, the optical interconnection system can be developed on the printed-wiring board inexpensively with high freedom while allowing highly packed interconnections to be formed on the printed-wiring board and designing the printed-wiring board with high freedom. As a result, high-speed distributed processing on the printed-wiring board, higher functionality of entire electronic devices, and shorter development TAT (Turn Around Time) can be expected.

A process of manufacturing the photoelectric transducer 1 according to the present invention will be described below with reference to FIGS. 8A through 8E and 9A through 9C.

Figure 8A:
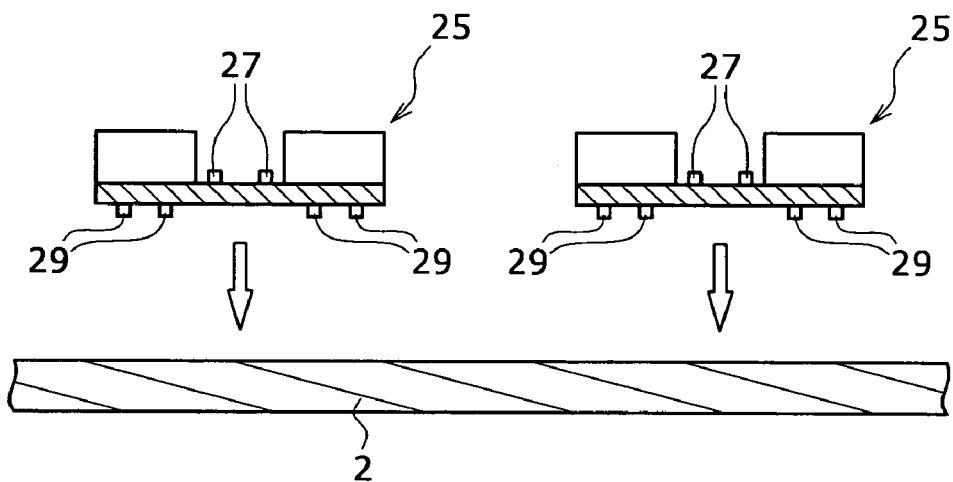
FIGS. 8A through 8E are fragmentary cross-sectional views showing a process of manufacturing a photoelectric transducer which incorporates sockets.
Figure 8B:
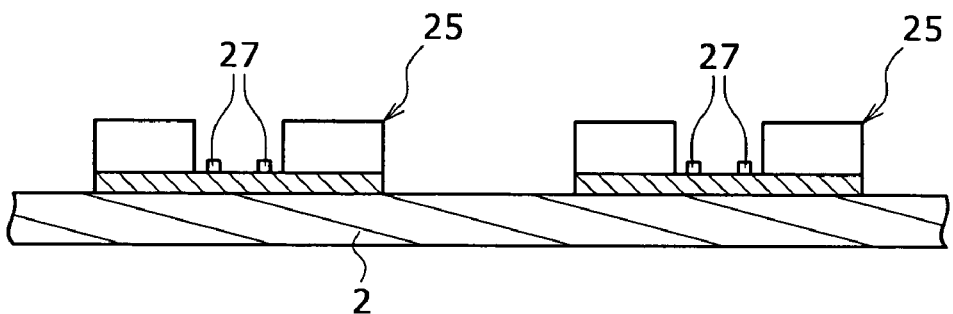

As shown in FIGS. 8A and 8B, a pair of sockets 25 is mounted on a printed-wiring board 2. At this time, electrodes (not shown) on printed-wiring board 2 and terminal pins 29 of the sockets 25 are positioned in alignment with each other to electrically connect the electrodes to the sockets 25.

Though not shown, the printed-wiring board 2 has electronic parts mounted thereon and electric interconnections formed thereon.

Figure 8C:
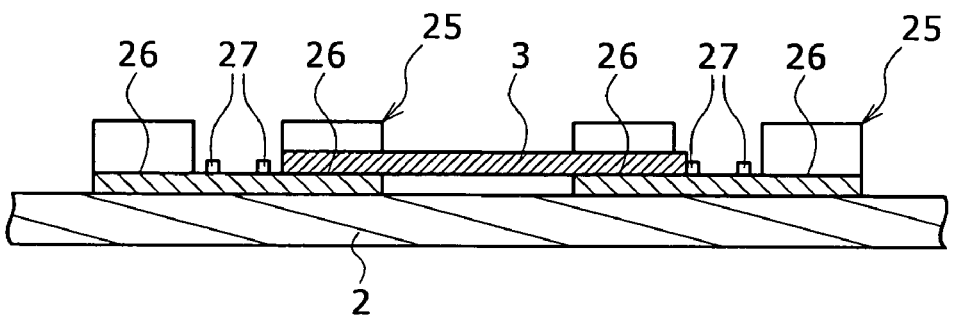

Then, as shown in FIG. 8C, an optical waveguide 3 is installed in recesses 26 of the sockets 25, and positioned to extend between the sockets 25. The optical waveguide 3 can easily be positioned longitudinally by pins 27 of the indented structure of the sockets 25, and also can easily be positioned transversely by the recesses 26. Since the optical waveguide 3 is installed in recesses 26, the optical waveguide 3 is held out of contact with the printed-wiring board 2.

Figure 9A:
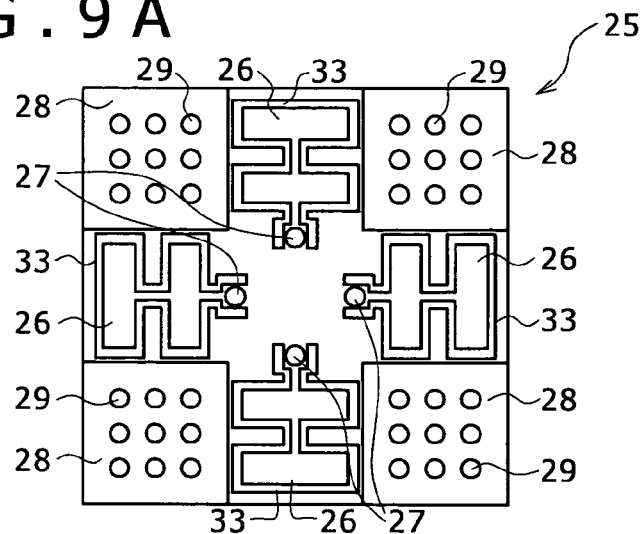
FIGS. 9A through 9C are plan views showing certain steps of the process of manufacturing a photoelectric transducer which incorporates sockets.
Figure 9B:
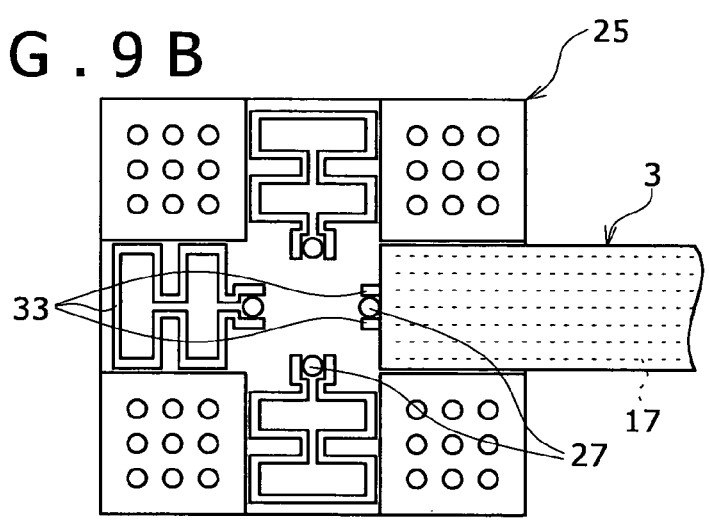
Figure 9C:
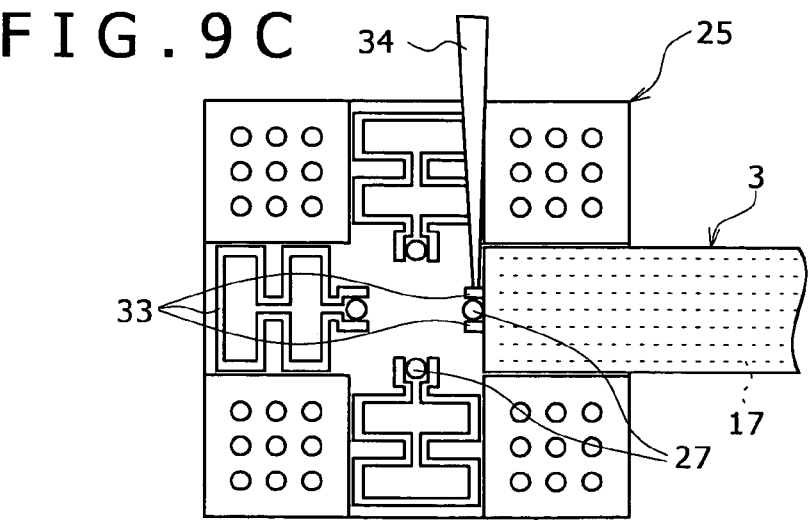

The optical waveguide 3 may be secured to the sockets 25 by any of various mediums, e.g., an adhesive synthetic resin. Specifically, as shown in FIG. 9A, slots 33 of any desired shape are formed in the bottoms of the recesses 26 of the sockets 25 such that the ends of the slots 33 are positioned at peripheral regions of the pins 27. Then, as shown in FIG. 9B, an end portion of the optical waveguide 3 which has a plurality of parallel core layers 17 is placed in one of the recesses 26 of one of the sockets 27. As described above, the optical waveguide 3 is easily positioned longitudinally and transversely by the pins 27 and the recesses 26 of the socket 25. Since the ends of the slots 33 are positioned at peripheral regions of the pins 27, the slot 33 disposed below the optical waveguide 3 has a portion not covered with the optical waveguide 3. Then, as shown in FIG. 9C, an adhesive synthetic resin is introduced from the uncovered portion of the slot 33 into the slot beneath the optical waveguide 3. When the introduced adhesive synthetic resin is set, it bonds the end of the optical waveguide 3 to the bottom of the recess of the recess 26. The other end of the optical waveguide 3 is similarly installed on the other socket 25.

Figure 8D:
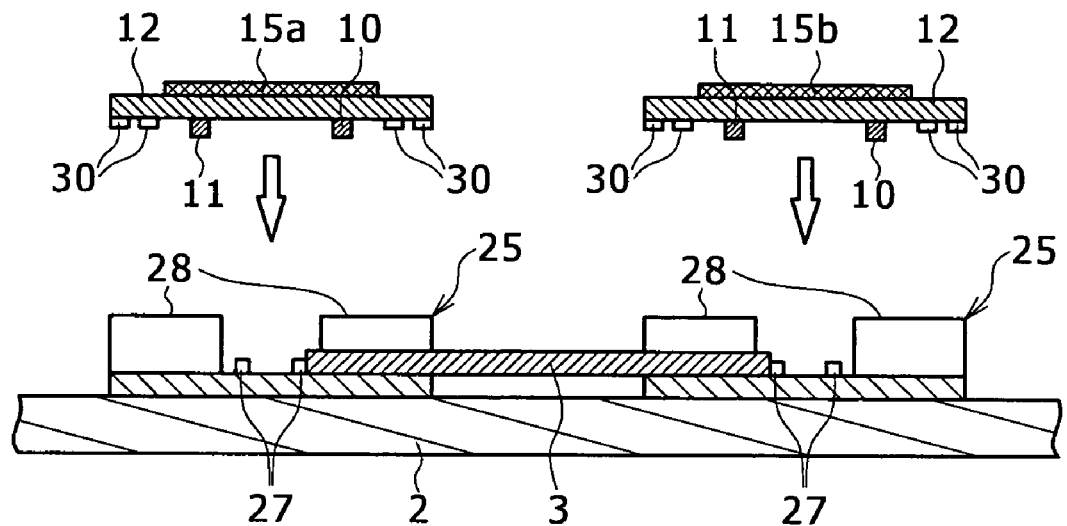

After the ends of the optical waveguide 3 are installed on the sockets 25, interposer boards 12 are fixedly mounted on the lands 28 of the sockets 25, as shown in FIG. 8D. The interposer boards 15 support an MPU (Micro Processor Unit) 15a and a DRAM (Dynamic Random Access Memory) 15b as respective drive circuits on upper surfaces thereof, and also support a light-emitting device array 10 and a light-detecting device array 11 on lower surfaces thereof. The lower surface of the interposer boards 15 are brought into contact with the lands 28 of the sockets 25, electrically connecting exposed terminal pins (not shown) on the lands 28 to the signal interconnection electrodes 30 on the interposer boards 12.

Figure 8E:
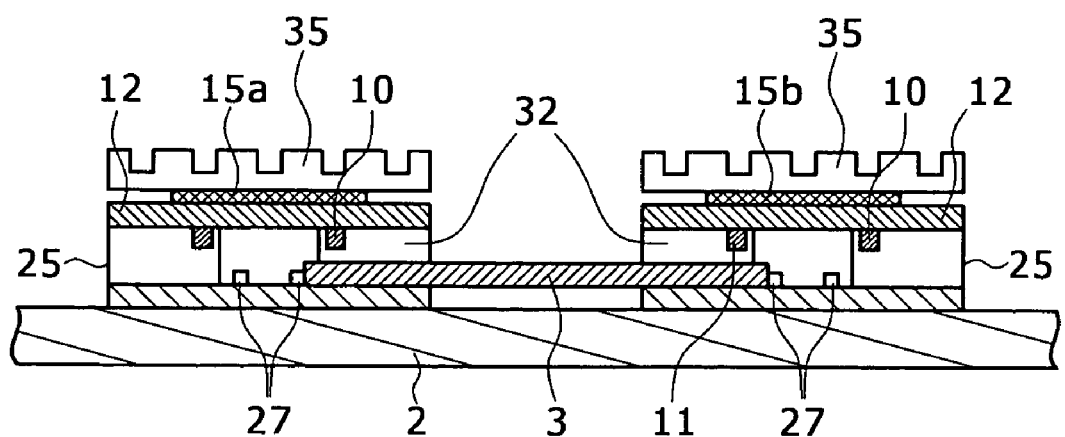

Then, as shown in FIG. 8E, aluminum fins 35 are mounted respectively on the MPU 15a and the DRAM 15b.

Using the photoelectric transducer 1 according to the present invention, an optical interconnection system having the optical waveguide 3 as optical interconnections is constructed in the manner described above.

Figure 10A:
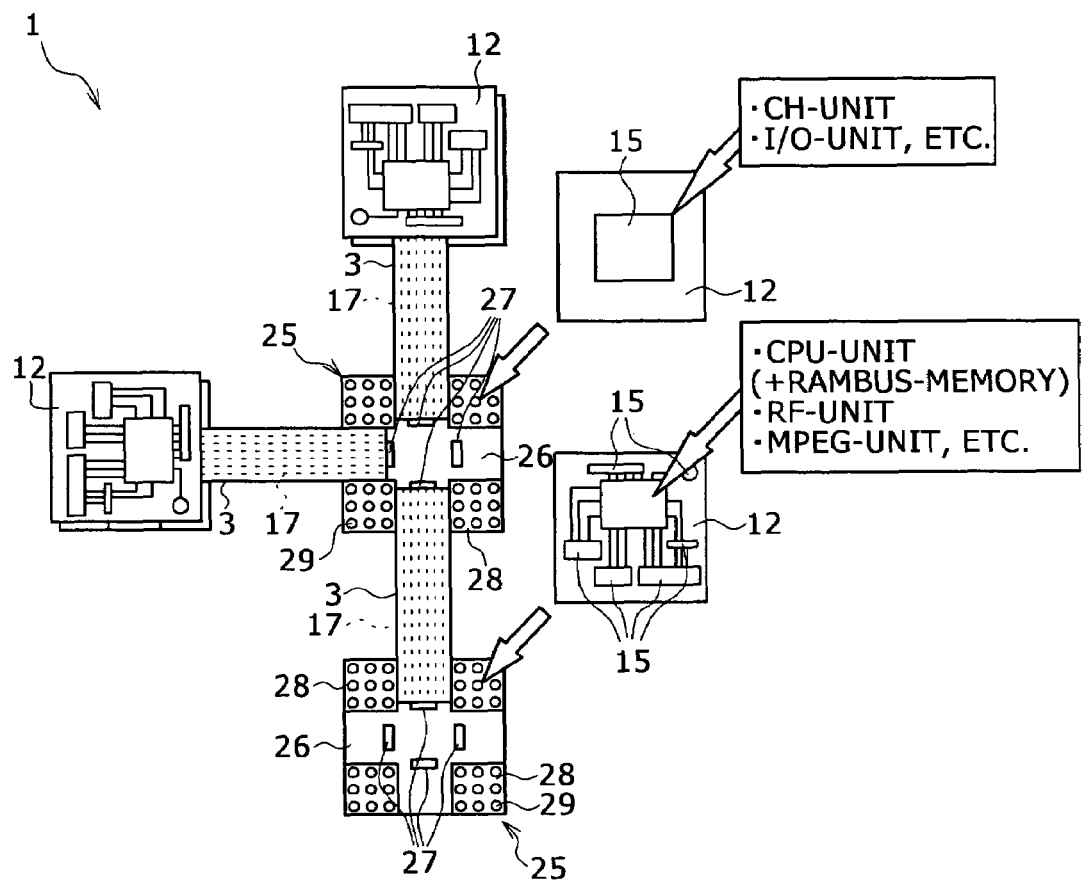
FIGS. 10A and 10B are plan views showing a photoelectric transducer which incorporates sockets.
Figure 10B:
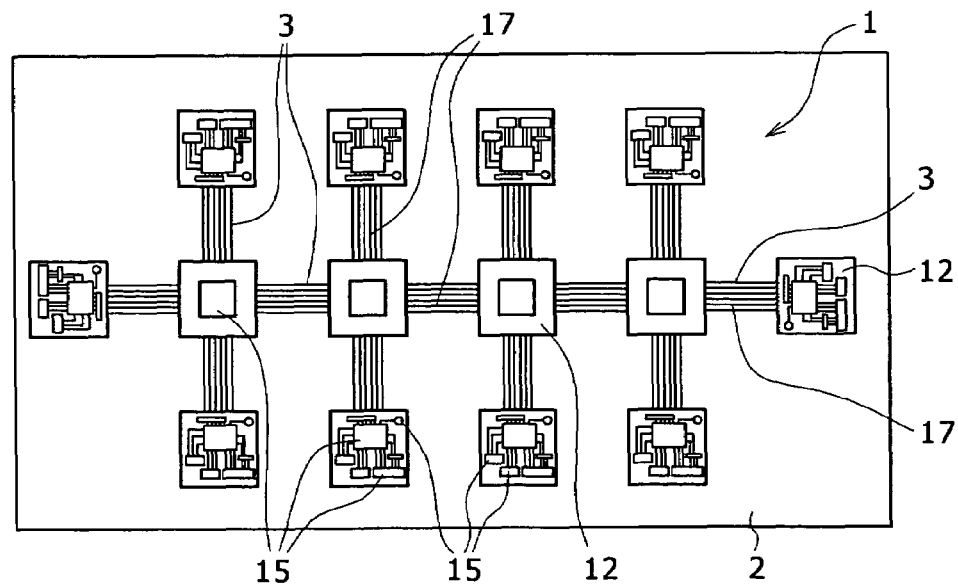

FIGS. 10A and 10B show a photoelectric transducer 1 which incorporates sockets 25 that is mounted on a printed-wiring board 2. The photoelectric transducer 1 includes a plurality of standardized optical waveguide modules or units that are connected by the sockets 25 so as to extend in four directions. FIG. 10B shows ten optical waveguide modules or units that are interconnected by the sockets 25.

According to the present embodiment, the photoelectric transducer element arrays 10, 11 have the light-emitting devices 4 and the light-detecting devices 6 which are associated with the entrance ends 18 and the exit ends 19 of the optical waveguide 3 and disposed on the respective common conductive layers 7, and the second poles 9 disposed in opposite relation to the first poles 8 of the light-emitting devices 4 and the light-detecting devices 6 and shared respectively by the light-emitting devices 4 and the light-detecting devices 6 are connected to at least two of the light-emitting devices 4 and the light-detecting devices 6 through the conductive layers 7. It is not necessary to take into account the distance between two adjacent second poles 9, and hence the light-emitting device array 10, the light-detecting device array 11, and hence the photoelectric transducer 1 may be reduced in size and cost.

Signal lines between the drive circuits 15a, 15b and the light-emitting devices 4 and the light-detecting devices 6, are short and of equal lengths. Therefore, electric signals flowing between the drive circuits 15a, 15b and the photoelectric transducer elements are easily and reliably protected against noise and crosstalk, and can modulate the laser beams at an increased speed.

Inasmuch as the photoelectric transducer 1 can be electrically connected to the printed-wiring board with the optical waveguide 3 installed in the recesses 26 of the sockets 25, the mount structure of the existing printed-wiring board can directly be employed. If areas for installing the sockets 25 are provided on the printed-wiring board, then other general electric interconnections can be formed according to a conventional process.

Even if the optical waveguide 3 is vulnerable to high-temperature processes, since the optical waveguide 3 can be installed in the recesses 26 of the sockets 25 after the sockets 25 are fixed to the printed-wiring board 2 and all mounting processes including high-temperature processes such as a solder reflow process and an underfiller resin sealing process are performed, the optical waveguide 3 can be mounted in position without being damaged by high temperatures.

The sockets 25 can be made of a synthetic resin which is more rigid than the printed-wiring board 2, and the light-emitting and light-detecting devices 4, 6 and the optical waveguide 3 can be optically connected on the sockets 25. Accordingly, it is easy to achieve a level of mounting accuracy which is required for optically coupling the light-emitting and light-detecting devices 4, 6 and the optical waveguide 3. For example, the assembling accuracy on the order of several μm can be achieved by the present molding technology. Consequently, it is possible to manufacture highly packed optical buses.

As the photoelectric transducer 1 can be electrically connected to the printed-wiring board 2 with the optical waveguide 3 installed in the recesses 26 of the sockets 25, the optical interconnection system can be developed on the printed-wiring board inexpensively with high freedom while allowing highly packed interconnections to be formed on the printed-wiring board and designing the printed-wiring board with high freedom. As a result, high-speed distributed processing on the printed-circuit board, higher functionality of entire electronic devices, and shorter development TAT (Turn Around Time) can be expected.

The drive circuits 15a, 15b are mounted on the sockets 25 with the interposer boards 12 interposed therebetween, and the spaces or clearances 32 are formed between the surface 31 of the optical waveguide 3 and the interposer boards 12. With this arrangement, even when the drive circuits 15a, 15b are heated when the photoelectric transducer 1 is in use, the optical waveguide 3 is effectively prevented from being broken by the heat from the drive circuits 15a, 15b.

Specific inventive examples of the present invention will be described below. However, the present invention is not limited to these specific inventive examples.

INVENTIVE EXAMPLE 1

A photoelectric transducer and a photoelectric transducer element array according to the third embodiment of the present invention as shown in FIGS. 3A through 3C were fabricated.

Specifically, the entrance ends 18 and the exit ends 19 of adjacent ones of the core layers 17 were disposed in different positions, i.e., staggered in position, in the axial direction of the optical waveguide 3 along which signal light is guided. The light-emitting device array 10 and the light-detecting device array 11 were made up of light-emitting devices 4 of p-AlGaAs, for example, and light-detecting devices 6, respectively, disposed on respective common conductive layers 7 each having an n-AlGaAs substrate having a thickness of 5 μm. The second poles 9 disposed in opposite relation to the first poles 8 of the light-emitting devices 4 and the light-detecting devices 6 and shared respectively by the light-emitting devices 4 and the light-detecting devices 6 were connected to at least two of the light-emitting devices 4 and the light-detecting devices 6 through the conductive layers 7. Adjacent ones of the light-emitting devices 4 and the light-detecting devices 6 were disposed in different positions, i.e., staggered in position, in the direction of the arrays in alignment with the respective core layers 17 of the optical waveguide 3. The conductive layers 7 were formed on the synthetic quartz substrate 36 having a thickness of 500 μm.

The first poles 8 have electrodes 20 of gold having a resistivity of 2.4 Ω·m and a thickness of 2 μm, the electrodes 20 being connected to the light-emitting devices 4 and the light-detecting devices 6. Solder posts 21 of nickel having a resistivity of 6.84 Ω·m, a diameter of about 80 μm, and a height of about 3 μm were mounted on the electrodes 20 for connection to the interposer board 12.

On each of the conductive layers 7, the electrode layer 24 made of gold having a resistivity of 2.4 Ω·m and a thickness of 5 μm, a width of 85 μm, and a depth of 70 μm, or made of copper, aluminum, or the like extended from the outer junction terminal 23 of the second pole 9 in the peripheral area including insulating films 22, e.g., polyimide insulating films having a thickness of 5 μm and a dielectric constant of 3.2, of the light-emitting devices 4 or the light-detecting devices 6. Specifically, the electrode layer 24 was formed substantially entirely in the peripheral area.

In the photoelectric transducer thus fabricated, a standard signal having a voltage of 2 V, a current of 5 mA, and a frequency of 2.5 GHz was supplied to a selected one of the light-emitting devices, and signal leakages to other adjacent light-emitting elements were calculated.

A photoelectric transducer element array and a photoelectric transducer similar to those shown in FIGS. 3A through 3C except that the electrode layer 24 was dispensed with were fabricated in the same manner as described above. Crosstalk between electric signals flowing through the light-emitting elements were measured.

Figure 11A:
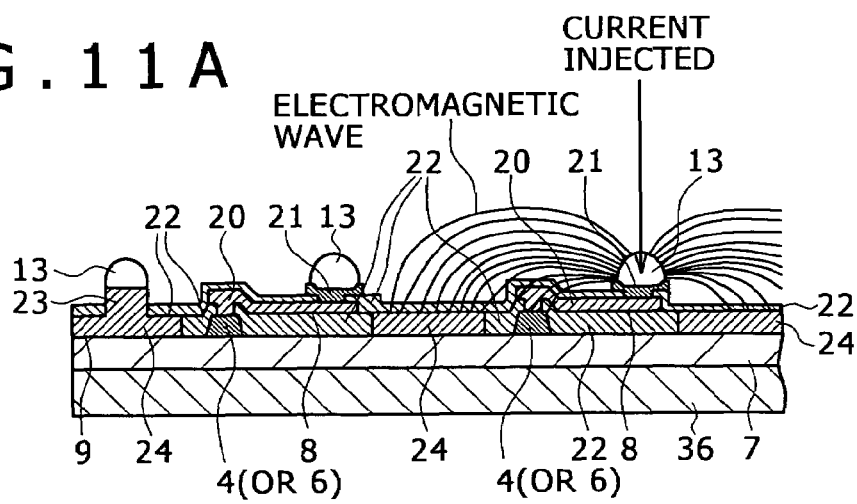
FIGS. 11A and 11B are fragmentary cross-sectional views illustrative of an evaluation of crosstalk of an electric signal according to the present invention.
Figure 11B:
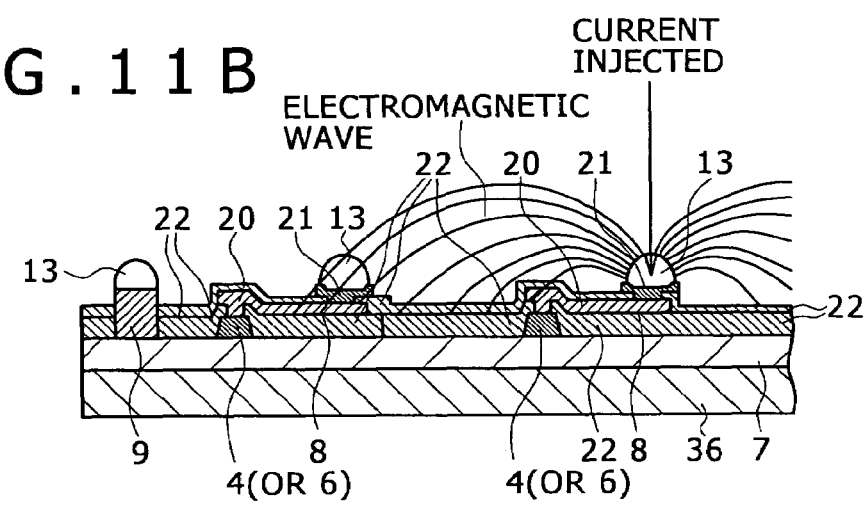

With the photoelectric transducer having no electrode layer as shown in FIG. 11B, current leakages (crosstalk) ranging from 1 to 3% were observed. With the photoelectric transducer having the electrode layer 24 as shown in FIG. 11A, current leakages (crosstalk) were reduced to 1/10 or less though their accurate values could not be calculated because they are too small.

The electrode layer 24 extending from the outer junction terminal 23 of the second pole 9 fully in the peripheral area of the light-emitting devices 4 and the light-detecting devices 6 is effective to terminate electromagnetic waves in the high-frequency range, thereby reducing electric signal crosstalk between the light-emitting devices 4 and the light-detecting devices 6. This allows the light-emitting devices 4 and the light-detecting devices 6 to be integrated at a higher level.

INVENTIVE EXAMPLE 2

A selected one of the light-emitting devices of the photoelectric transducer having no electrode layer, which was fabricated in Inventive Example 1, was supplied with a standard signal having a voltage of 2 V, a current of 5 mA, and a frequency of 2.5 GHz. A measured drive current of the light-emitting device was 100 µA, indicating a high resistance. This suggests that because the photoelectric transducer elements were arranged in the two-dimensional arrays and the second poles were shared by the photoelectric transducer elements, drive currents of the photoelectric transducer elements that were positioned on inner and outer sides of the conductive layers concentrated on the second poles that are positioned outside of the arrays. The current concentration resulted in different drive efficiencies of outermost ones of the photoelectric transducer elements and inner ones of the photoelectric transducer elements, lowering the total characteristics and reliability of the photoelectric transducer element arrays. That is, the inner and outer photoelectric transducer elements have widely different drive efficiencies, and do not have uniform characteristics.

When a selected one of the light-emitting devices of the photoelectric transducer having the electrode layer of gold was supplied with a standard signal having a voltage of 2 V, a current of 5 mA, and a frequency of 2.5 GHz, the drive current of the light-emitting device was much larger, indicating a lower resistance. Since the second pole and the photoelectric transducer elements are interconnected by the electrode layer of low resistance, variations in the modulating characteristics are reduced, and the photoelectric transducer elements can be integrated at a higher level.

The width of the electrode layer, having a thickness of 5 µm, existing between adjacent ones of the light-emitting devices of the photoelectric transducer having the electrode layer which was fabricated in Inventive Example 1 was varied in the range from 10 µm to 70 µm, and drive current (resistance) changes were evaluated. The results of the evaluation are shown in FIG. 12.

Figure 12:
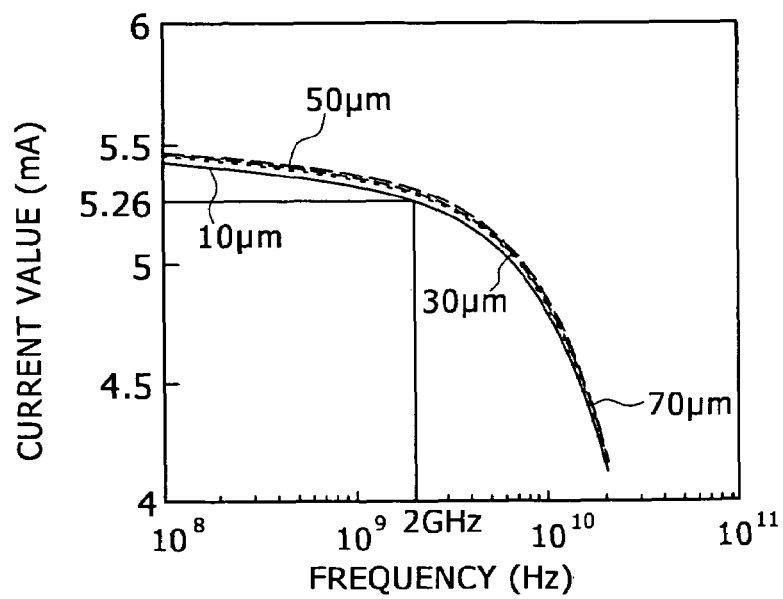
FIG. 12 is a graph showing an evaluation of drive current (resistance) changes caused as the width of an electrode layer (having a thickness of 5 μm) of gold interposed between adjacent light-emitting devices changed from 10 μm to 70 μm in a photoelectric transducer.

As can be seen from FIG. 12, the drive current increased to 4.5 mA or more, and the width of the electrode layer could be reduced to about 10 µm. However, if the width of the electrode layer is too small, then the resistance would tend to be large, reducing the drive current.

The present invention has been described above as being applied to an optical interconnection system for transmitting a laser beam modulated by a desired signal. However, the principles of the present invention are also applicable to an optical interconnection system for use in displays with appropriately selected light sources.

The cladding layers may have light collimating or focusing elements, e.g., optical components such as lenses, disposed at the entrance and exist ends of the core layers. The light collimating or focusing elements are capable of focusing light signals from the light-emitting devices and efficiently introducing the focused light signals into the optical waveguide, and of effectively collimating light signals emitted from the optical waveguide to allow the light-detecting devices to efficiently detect the emitted light signals. The light collimating or focusing elements may be integrally formed with the cladding layers or may subsequently be added to the cladding layers. Particularly, the light collimating or focusing elements should preferably be integrally formed with the cladding layers at the entrance and exist ends of the core layers. The light collimating or focusing elements thus integrally formed with the cladding layers are positioned and fabricated more easily and less costly than they are subsequently added as optical components such as lenses. The light collimating or focusing elements that are integrally formed with the cladding layers are also advantageous in that the number of separate parts is not increased and the productivity is high.

Optical components may be combined with the light-emitting devices and the light-detecting devices. The optical components thus combined are capable of collimating light signals, e.g., laser beam signals, from the light-emitting devices into parallel-light signals and efficiently introducing the parallel-light signals into the core layers of the optical waveguide, and of effectively focusing light signals emitted from the optical waveguide to travel to the light-detecting devices. Even if the light-emitting devices are positionally displaced, the light collimating or focusing elements and the optical components are effective to focus the signal light from the light-emitting devices and introduce the signal light into the core layers for efficient optical coupling.

The photoelectric transducer according to the present invention can be used with optical interconnections for efficiently converging signal light into light to travel through an optical waveguide or efficiently introducing signal light into an optical waveguide, emitting the signal light from the optical waveguide, and introducing the emitted signal light into light-detecting devices, e.g., optical interconnections, photodetectors, etc., in a next stage.

Although certain preferred embodiments of the present invention have been shown and described in detail, it should be understood that various changes and modifications may be made therein without departing from the scope of the appended claims.

What is claimed is:

1. An optical communications system comprising:
   an optical waveguide;
   a first photoelectric transducer element array of photoelectric transducer elements optically coupled to said optical waveguide; and
   a second photoelectric transducer element array of photoelectric transducer elements optically coupled to said optical waveguide;
   wherein said first photoelectric transducer element array comprises light emitting elements, and said second photoelectric transducer element array comprises light detecting elements; and
   wherein said photoelectric transducer elements are mounted in alignment with entrance or exit ends of said optical waveguide, each of said photoelectric transducer elements having respective first poles, and each of said first and second photoelectric transducer element arrays having a respective second pole disposed adjacent to said first poles and the second pole being connected to at least two of the photoelectric transducer elements comprising the respective first and second transducer element arrays.

2. The optical communications system according to claim 1, wherein adjacent ones of said entrance or exit ends of said optical waveguide are disposed in different positions in an axial direction of said optical waveguide along which signal light is guided.

3. The optical communications system according to claim 1, wherein each of said photoelectric transducer elements has an electrode layer extending from an outer junction terminal of said second pole.

4. The optical communications system according to claim 3, wherein said electrode layer is disposed substantially fully in a peripheral area.

5. The optical communications system according to claim 3, wherein said electrode layer is arranged in a linear pattern.

6. The optical communications system according to claim 1, wherein each of said photoelectric transducer elements are comprised of a semiconductor material and are disposed over a conductive layer.

7. The optical communications system according to claim 6, wherein said second pole is comprised of a metal.

8. The optical communications system according to claim 1, wherein said photoelectric transducer elements are optically coupled to said optical waveguide.

9. The optical communications system according to claim 1, further comprising an interposer board and a drive circuit mounted on said interposer board for energizing said light emitting elements.

10. The optical communications system according to claim 1, wherein said optical waveguide comprises a cladding layer and a plurality of core layers disposed in said cladding layer.

11. A photoelectric transducer element array comprising a plurality of photoelectric transducer elements having respective first poles, said photoelectric transducer element array having a second pole connected as a reference potential setting electrode to at least two of said photoelectric transducer elements, at least two adjacent photoelectric transducer elements comprising said array being positionally offset from one another in two lateral directions.

12. The photoelectric transducer element array according to claim 11, comprising an electrode extending from said second pole in a peripheral area of said photoelectric transducer elements.

13. The photoelectric transducer element array according to claim 12, wherein said electrode layer is disposed substantially fully in said peripheral area.

14. The photoelectric transducer element array according to claim 12, wherein said electrode layer is formed as a linear pattern surrounding each of said photoelectric transducer elements.

15. The photoelectric transducer element array according to claim 12, wherein said photoelectric transducer elements are optically coupled to an optical waveguide.

16. The photoelectric transducer element array according to claim 12, further comprising an interposer board and a drive circuit mounted on said interposer board for energizing said photoelectric transducer elements.

17. The photoelectric transducer element array according to claim 11, wherein said photoelectric transducer elements are comprised of a semiconductor material.

18. The photoelectric transducer element array according to claim 17, wherein said second pole is made of metal.

19. The photoelectric transducer element array according to claim 11, wherein a first array portion of photoelectric transducer elements comprises light emitting devices, and a second array portion of photoelectric transducer elements comprises light detecting devices, said first array portion having a respective adjacently formed second pole, and said second array portion having a respective adjacently formed second pole.

20. An optical communications system comprising:
an optical waveguide; and
a photoelectric transducer element array comprising photoelectric transducer elements optically coupled to said optical waveguide;
wherein said photoelectric transducer elements are mounted in alignment with entrance or exit ends of said optical waveguide, said photoelectric transducer elements having respective first poles, and said photoelectric transducer element array having a second pole disposed adjacent to said first poles and the second pole being connected to at least two of the photoelectric transducer elements, and
wherein adjacent ones of said entrance or exit ends of said optical waveguide are disposed in different positions in an axial direction of said optical waveguide along which signal light is guided.

* * * * *